(12) United States Patent
Sahara et al.

(10) Patent No.: US 12,461,222 B2
(45) Date of Patent: Nov. 4, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Tooru Sahara, Yokohama (JP); Jun Kuroda, Kodaira (JP); Takuya Homma, Yokohama (JP); Fangwei Tong, Machida (JP); Kenji Yamamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 347 days.

(21) Appl. No.: 18/044,135

(22) PCT Filed: Sep. 2, 2021

(86) PCT No.: PCT/JP2021/032349
§ 371 (c)(1),
(2) Date: Mar. 6, 2023

(87) PCT Pub. No.: WO2022/064995
PCT Pub. Date: Mar. 31, 2022

(65) Prior Publication Data
US 2023/0333234 A1    Oct. 19, 2023

(30) Foreign Application Priority Data

Sep. 28, 2020    (JP) ................ 2020-162621

(51) Int. Cl.
*G01S 13/536*    (2006.01)
*G01S 7/35*    (2006.01)
(Continued)

(52) U.S. Cl.
CPC ............ *G01S 13/536* (2013.01); *G01S 7/352* (2013.01); *G01S 13/58* (2013.01); *G01S 13/931* (2013.01)

(58) Field of Classification Search
CPC .... G01S 13/931; G01S 13/343; G01S 13/584; G01S 13/345
(Continued)

(56) References Cited

U.S. PATENT DOCUMENTS 4,488,154 A * 12/1984 Ward .................... G01S 13/532
                                                            342/194
4,713,664 A * 12/1987 Taylor, Jr. ........... G01S 13/5246
                                                            342/91
(Continued)

FOREIGN PATENT DOCUMENTS

JP    S60-093975 A    5/1985
JP    2000-180536 A    6/2000
(Continued)

OTHER PUBLICATIONS

Yonggang Ji et al., "Vessel target detection using zero-Doppler spectra of radar echo for high-frequency surface wave radar", IET Radar, Sonar & Navigation, 2016, vol. 10, Iss. 7, pp. 1243-1248, The Institution of Engineering and Technology, XP006057768.

*Primary Examiner* — Michael W Justice
(74) *Attorney, Agent, or Firm* — Studebaker Brackett PLLC (57) ABSTRACT

An electronic device includes a transmission antenna, a reception antenna, and a controller. The transmission antenna transmits a transmission wave. The reception antenna receives a reflected wave that is the transmission wave having been reflected. The controller detects a target by using a constant false alarm rate, based on a transmission signal transmitted as the transmission wave and a reception signal received as the reflected wave. The controller detects an object by using the constant false alarm rate, based on a signal intensity of a complex signal corresponding to a distance of an object whose relative velocity with respect to the electronic device is zero.

7 Claims, 7 Drawing Sheets

(51) Int. Cl.
*G01S 13/58* (2006.01)
*G01S 13/931* (2020.01)

(58) Field of Classification Search
USPC .......................................................... 342/70
See application file for complete search history.

(56) References Cited

U.S. PATENT DOCUMENTS

| | | | |
|---|---|---|---|
| 5,465,095 A * | 11/1995 | Bryant | G01S 13/5244 342/162 |
| 6,384,769 B1 | 5/2002 | Mitsumoto et al. | |
| 7,623,061 B2 * | 11/2009 | Spyropulos | G01S 13/42 342/170 |
| 7,667,639 B2 * | 2/2010 | Cheng | G01S 13/536 342/174 |
| 8,482,452 B2 * | 7/2013 | Chambers | G06N 99/00 342/25 R |
| 9,103,910 B2 * | 8/2015 | Holder | G01S 13/06 |
| 9,529,078 B2 * | 12/2016 | Holder | G01S 7/2927 |
| 10,823,836 B2 | 11/2020 | Wintermantel | |
| 10,843,690 B2 * | 11/2020 | Shalev-Shwartz | B60W 30/165 |
| 10,850,728 B2 * | 12/2020 | Shalev-Shwartz | B60W 60/0027 |
| 10,933,868 B2 * | 3/2021 | Shalev-Shwartz | B60W 50/0097 |
| 11,061,127 B2 * | 7/2021 | Klotzbuecher | G01S 13/726 |
| 2008/0012753 A1 * | 1/2008 | Cheng | G01S 13/0218 342/174 |
| 2008/0111733 A1 * | 5/2008 | Spyropulos | G01S 7/412 342/189 |
| 2013/0082870 A1 * | 4/2013 | Chambers | G01S 13/003 342/25 A |
| 2015/0109165 A1 * | 4/2015 | Holder | G01S 7/2922 342/159 |
| 2016/0033623 A1 * | 2/2016 | Holder | G01S 7/0234 342/93 |
| 2018/0136324 A1 * | 5/2018 | Klotzbuecher | G01S 7/354 |
| 2019/0291726 A1 * | 9/2019 | Shalev-Shwartz | G01S 13/931 |
| 2019/0291728 A1 * | 9/2019 | Shalev-Shwartz | B60W 10/06 |
| 2019/0299984 A1 * | 10/2019 | Shalev-Shwartz | G01S 13/865 |
| 2019/0337509 A1 * | 11/2019 | Shalev-Shwartz | B60W 40/105 |

FOREIGN PATENT DOCUMENTS

| | | |
|---|---|---|
| JP | 2017-191074 A | 10/2017 |
| JP | 2017-203750 A | 11/2017 |
| JP | 2019-500593 A | 1/2019 |
| KR | 20190070088 A | 6/2019 |

* cited by examiner

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2020-162621 filed in Japan on Sep. 28, 2020, the entire disclosure of which is incorporated herein by reference.

TECHNICAL FIELD

The present disclosure relates to an electronic device, a method for controlling an electronic device, and a program.

BACKGROUND OF INVENTION

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and then receiving a reflected wave reflected off the object. Such a technology for measuring a distance or the like expectedly becomes more important in the future with progresses of a technology for assisting drivers in driving and an automated-driving-related technology for partially or entirely automating driving.

Various suggestions have been made in relation to a technology for detecting the presence of a predetermined object by receiving a reflected wave of a radio wave that has been transmitted and reflected off the object. For example, Patent Literature 1 discloses an apparatus that stores past data of reflected waves as a map, with which the apparatus suppresses clutter. Patent Literature 2 discloses a radar device that recognizes each of multiple targets as being a moving object or a stationary object, and measures a distance and a velocity of each of the objects.

CITATION LIST

Patent Literature

Patent Literature 1: Japanese Unexamined Patent Application Publication No. 60-093975
Patent Literature 2: Japanese Unexamined Patent Application Publication No. 2000-180536

SUMMARY

In one embodiment, an electronic device includes a transmission antenna that transmits a transmission wave, a reception antenna that receives a reflected wave that is the transmission wave having been reflected, and a controller.

The controller detects a target by using a constant false alarm rate, based on a transmission signal transmitted as the transmission wave and a reception signal received as the reflected wave.

The controller detects an object by using the constant false alarm rate, based on a signal intensity of a complex signal corresponding to a distance of an object whose relative velocity with respect to the electronic device is zero.

In one embodiment, a method for controlling an electronic device includes transmitting a transmission wave from a transmission antenna,
receiving, from a reception antenna, a reflected wave that is the transmission wave having been reflected, and
detecting a target by using a constant false alarm rate, based on a transmission signal transmitted as the transmission wave and a reception signal received as the reflected wave.

In the detecting of the method, an object is detected by using the constant false alarm rate, based on a signal intensity of a complex signal corresponding to a distance of an object whose relative velocity with respect to the electronic device is zero.

In one embodiment, a program causes an electronic device to execute transmitting a transmission wave from a transmission antenna,
receiving, from a reception antenna, a reflected wave that is the transmission wave having been reflected, and
detecting a target by using a constant false alarm rate, based on a transmission signal transmitted as the transmission wave and a reception signal received as the reflected wave.

In the detecting of the program, an object is detected by using the constant false alarm rate, based on a signal intensity of a complex signal corresponding to a distance of an object whose relative velocity with respect to the electronic device is zero.

DESCRIPTION OF EMBODIMENTS

A technology such as the radar described above is desirably capable of detecting a predetermined object with good accuracy by receiving a reflected wave that is a transmitted transmission wave reflected off the object. An objective of the present disclosure is to provide an electronic device, a method for controlling an electronic device, and a program that can detect an object with good accuracy. One embodiment provides an electronic device, a method for controlling an electronic device, and a program that can detect an object with good accuracy. The one embodiment is described in detail below with reference to the drawings.

In the one embodiment, an electronic device is attached to, for example, a stationary structure (stationary object) and thus is capable of detecting a predetermined object located around the stationary object. The stationary object may be, for example, any device such as a traffic light installed at a crossing or a roadside unit or may be, for example, any portion such as a floor, a wall, or a ceiling of an indoor space. To this end, the electronic device according to the one embodiment is capable of transmitting a transmission wave to an area around the stationary object from a transmission antenna installed on or in the stationary object. The electronic device according to the one embodiment is also capable of receiving a reflected wave that is the reflected transmission wave, from a reception antenna installed on or in the stationary object. For example, a radar sensor or the like installed on or in the stationary object may include at least one of the transmission antenna or the reception antenna.

A typical configuration example is described below in which the electronic device according to the one embodiment is attached to a stationary structure. An object detected by the electronic device according to the one embodiment may be an automobile or the like located around the electronic device attached to a stationary object, for example. The object detected by the electronic device according to the one embodiment is not limited to an automobile. The object detected by the electronic device according to the one embodiment may be any of various objects such as an autonomous car, a bus, a truck, a motorcycle, a bicycle, a ship, an aircraft, an agricultural machinery such as a tractor, a snowplow, a garbage truck, a police car, an ambulance, a fire engine, a helicopter, and a drone. The electronic device according to the one embodiment is capable of measuring a distance or the like between the electronic device and an object located around the electronic device attached to the stationary object when the object is movable. The electronic device according to the one embodiment is also capable of measuring a distance or the like between the electronic device and the object when both the electronic device and the object are stationary.

An example of how the electronic device according to the one embodiment detects an object is described.

Figure 1:
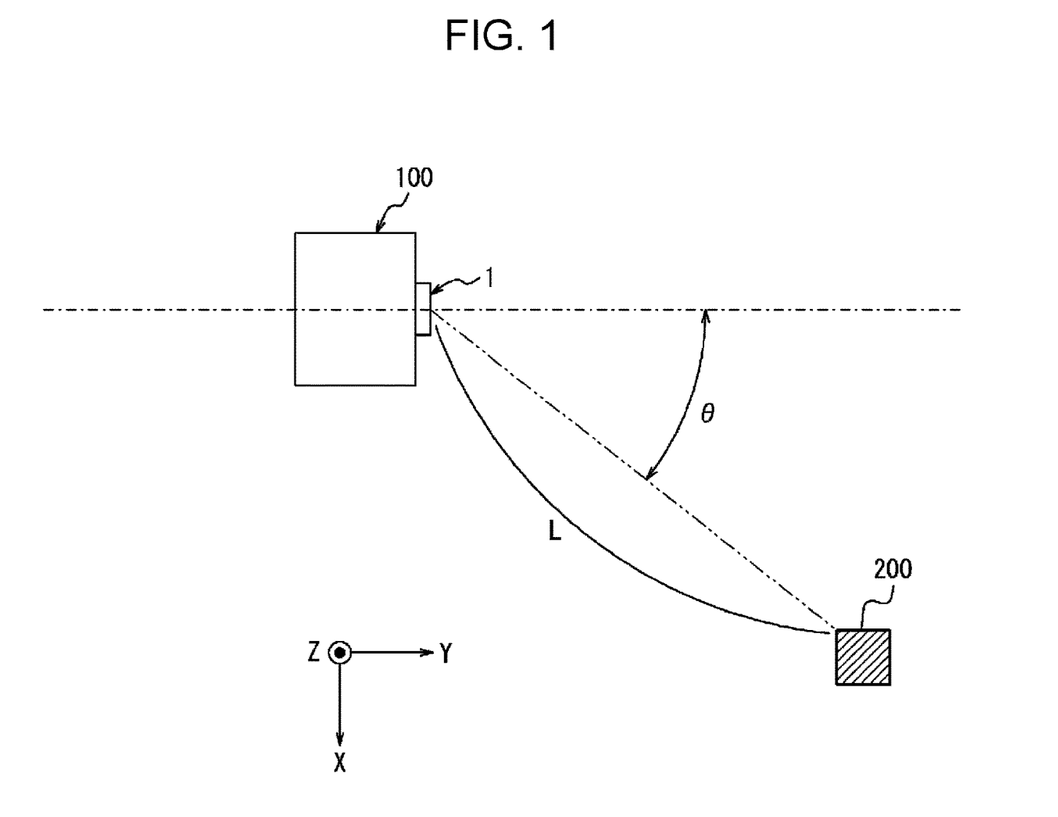
FIG. 1 is a diagram for describing how an electronic device according to one embodiment is used.

FIG. 1 is a diagram for describing how the electronic device according to the one embodiment is used. The electronic device according to the one embodiment has functions of a sensor including a transmission antenna and a reception antenna. FIG. 1 illustrates an example in which such an electronic device is installed on a stationary object.

In FIG. 1, an electronic device 1 according to one embodiment is installed on a stationary object 100. The electronic device 1 has functions of a sensor including a transmission antenna and a reception antenna. For example, the stationary object 100 illustrated in FIG. 1 may include the electronic device 1 according to the one embodiment therein. A specific configuration of the electronic device 1 is described later. The electronic device 1 may include at least one of the transmission antenna or the reception antenna, for example. The electronic device 1 may appropriately include at least any of other functional units, such as at least part of a controller 10 (FIG. 2) included in the electronic device 1. The electronic device 1 may include at least any of other functional units, such as at least part of the controller 10 (FIG. 2) included in the electronic device 1, installed outside the electronic device 1. The stationary object 100 illustrated in FIG. 1 may be, for example, a structure such as a traffic light installed at a crossing or a roadside unit but may be a structure of any type. In FIG. 1, the stationary object 100 may be stationary without moving.

As illustrated in FIG. 1, the electronic device 1 including the transmission antenna is installed on the stationary object 100. In the example illustrated in FIG. 1, only one electronic device 1 including the transmission antenna and the reception antenna is installed in a positive Y-axis direction of the stationary object 100. The position where the electronic device 1 is installed on the stationary object 100 is not limited to the position illustrated in FIG. 1 and may be another appropriate position. The number of such electronic devices 1 may be any number equal to or greater than 1 depending on various conditions (or requirements) such as a range and/or an accuracy of measurement performed at the stationary object 100.

As described later, the electronic device 1 transmits an electromagnetic wave as a transmission wave from the transmission antenna. For example, when a predetermined object (for example, an object 200 illustrated in FIG. 1) is located around the stationary object 100, at least part of the transmission wave transmitted from the electronic device 1 is reflected off the object to become a reflected wave. For example, the reception antenna of the electronic device 1 receives such a reflected wave. In this manner, the electronic device 1 attached to the stationary object 100 can detect the object as a target.

The electronic device 1 including the transmission antenna may be typically a radar (Radio Detecting and Ranging) sensor that transmits and receives a radio wave. However, the electronic device 1 is not limited to a radar sensor. In one embodiment, the electronic device 1 may be, for example, a sensor based on the LIDAR (Light Detection and Ranging, Laser Imaging Detection and Ranging) technology that uses an optical wave. Each of these sensors can include, for example, a patch antenna. Since the technologies such as the radar and the LIDAR are already known, detailed description may be appropriately simplified or omitted.

The electronic device 1 attached to the stationary object 100 illustrated in FIG. 1 receives, from the reception antenna, the reflected wave of the transmission wave transmitted from the transmission antenna. In this manner, the electronic device 1 can detect, as the target, the predetermined object 200 located within a predetermined distance from the stationary object 100. For example, as illustrated in FIG. 1, the electronic device 1 can measure a distance L between the stationary object 100 and the predetermined object 200. The electronic device 1 can also measure a relative velocity of the predetermined object 200 with respect to the stationary object 100. The electronic device 1 can further measure a direction (an angle of arrival $\theta$) from which the reflected wave from the predetermined object 200 arrives at the stationary object 100.

The object 200 may be, for example, an automobile or the like that travels around the stationary object 100. The object 200 may also be any object located around the stationary object 100, such as a motorcycle, a bicycle, a stroller, a person such as a pedestrian, other forms of life such as an animal or an insect, a guardrail, a median strip, a road sign, a step on a sidewalk, a wall, a maintenance hole, a structure such as a house, a building, or a bridge, or an obstacle. The object 200 may be in motion or may be stopped or stationary. For example, the object 200 may be an automobile or the like that is parked or stationary around the stationary object 100. The object 200 may be located not only on a road but also at an appropriate place such as on a sidewalk, in a farm, on a farmland, in a parking lot, in a vacant lot, in a space on a road, in a store, at a crossing, on the water, in the air, in a gutter, in a river, in another mobility device, in a building, inside or outside of other structures. In the present disclosure, the object detected by the electronic device 1 includes living things such as a person, a dog, a cat, a horse, and other animals in addition to non-living things. The object detected by the electronic device 1 in the present disclosure includes a target, which includes a person, an object, and an animal, to be detected with the radar technology.

In FIG. 1, a ratio between a size of the electronic device 1 and a size of the stationary object 100 does not necessarily indicate an actual ratio. FIG. 1 illustrates the electronic device 1 that is installed on an outer portion of the stationary object 100. However, in one embodiment, the electronic device 1 may be installed at various positions of the stationary object 100. For example, in one embodiment, the electronic device 1 may be installed inside the stationary object 100 so as not to be seen in the appearance of the stationary object 100.

In a typical example described blow, the transmission antenna of the electronic device 1 transmits a radio wave in a frequency band, such as a millimeter wave (equal to or higher than 30 GHz) or a quasi-millimeter wave (for example, around 20 GHz to 30 GHz). For example, the transmission antenna of the electronic device 1 may transmit a radio wave having a frequency bandwidth of 4 GHz such as from 77 GHz to 81 GHz.

Figure 2:
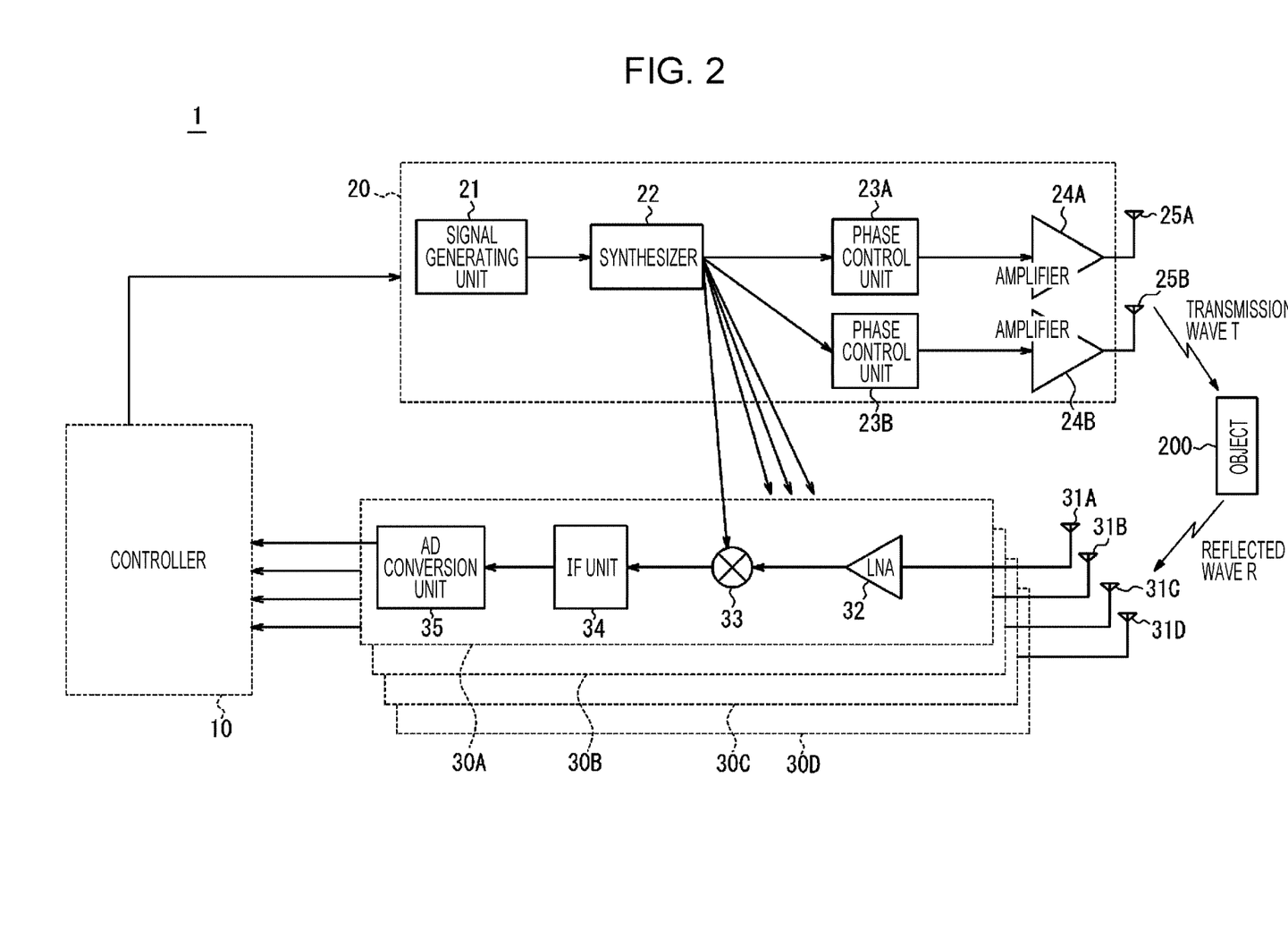
FIG. 2 is a functional block diagram schematically illustrating a configuration of the electronic device according to the one embodiment.
Figure 3:
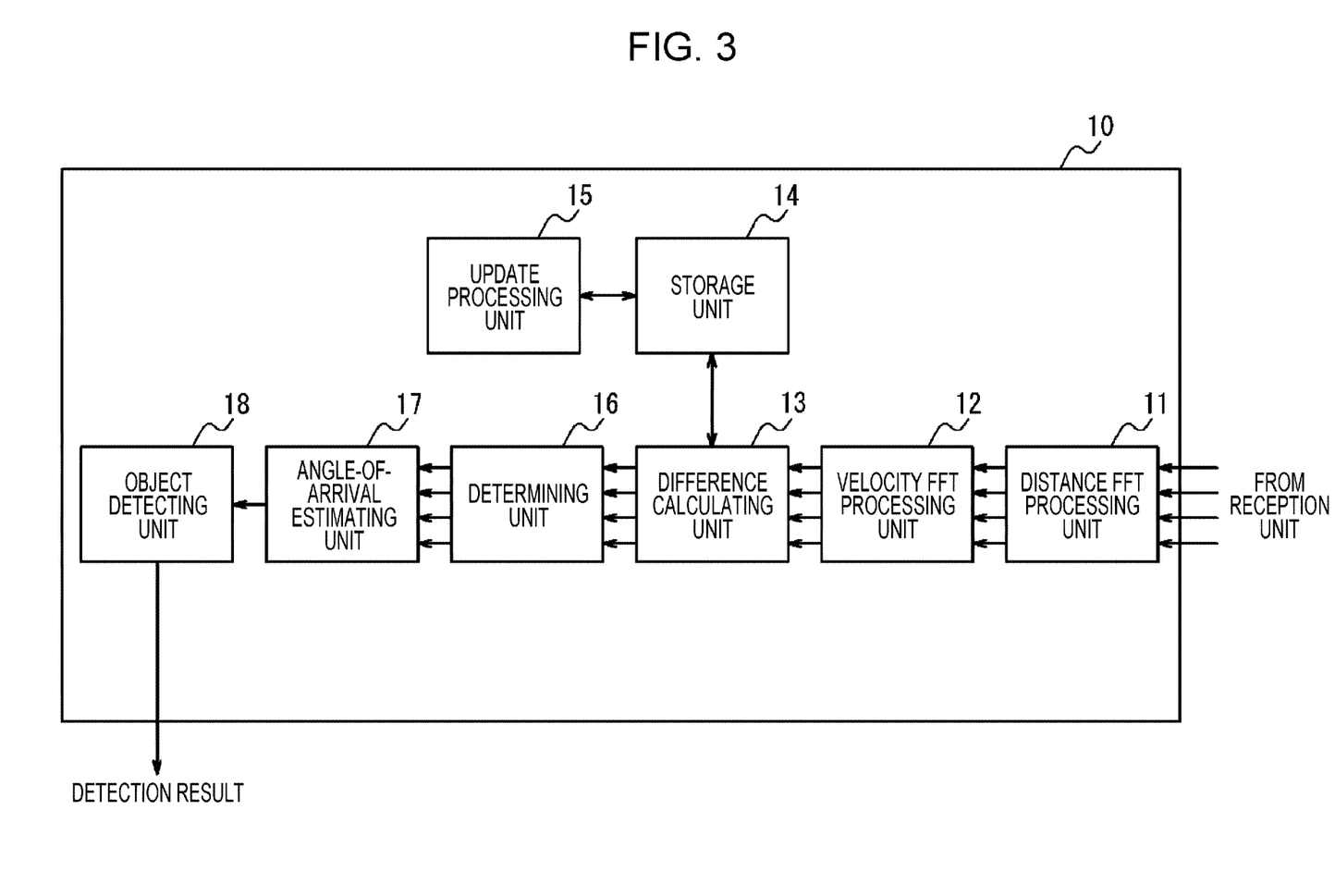
FIG. 3 is a functional block diagram illustrating part of the configuration of the electronic device according to the one embodiment.

FIG. 2 is a functional block diagram schematically illustrating an example of a configuration of the electronic device 1 according to the one embodiment. FIG. 3 is a functional block diagram illustrating in detail the controller 10 of the electronic device 1 illustrated in FIG. 2. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency band of 79 GHz has a feature that a usable frequency bandwidth is wider than other millimeter-wave and/or quasi-millimeter-wave radars of frequency bands of 24 GHz, 60 GHz, and 76 GHz, for example. Such an embodiment is described below as an example. The FMCW radar scheme used in the present disclosure may include an FCM scheme (Fast-Chirp Modulation) for transmitting chirp signals at a shorter period than usual. A signal generated by a signal generating unit 21 is not limited to a signal of the FM-CW scheme. The signal generated by the signal generating unit 21 may be a signal of any of various schemes other than the FM-CW scheme. A transmission signal sequence stored in any storage unit may change in accordance with these various schemes. For example, in the case of a radar signal of the FM-CW scheme described above, a signal whose frequency increases for each time sample and a signal whose frequency decreases for each time sample may be used. More detailed description of the various schemes described above is omitted because known techniques can be appropriately employed.

As illustrated in FIG. 2, the electronic device 1 according to the one embodiment includes the controller 10. The electronic device 1 according to the one embodiment may also appropriately include another functional unit such as at least any of a transmission unit 20 or reception units 30A to 30D. As illustrated in FIG. 2, the electronic device 1 may include multiple reception units such as the reception units 30A to 30D. When the reception units 30A, 30B, 30C, and 30D are not distinguished from one another, the reception units 30A, 30B, 30C, and 30D are simply referred to as "reception units 30" below.

As illustrated in FIG. 3, the controller 10 may include a distance FFT processing unit 11, a velocity FFT processing unit 12, a difference calculating unit 13, a storage unit 14, an update processing unit 15, a determining unit 16, an angle-of-arrival estimating unit 17, and an object detecting unit 18. These functional units included in the controller 10 are further described later.

As illustrated in FIG. 2, the transmission unit 20 may include the signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 249 are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the multiple reception units 30 may include an LNA 32, a mixer 33, an IF unit 34, and an AD conversion unit 35. The reception units 30A to 30D may have the same and/or similar configuration. FIG. 2 schematically illustrates the configuration of the reception unit 30A alone as a representative example.

The electronic device 1 described above may include, for example, the transmission antennas 25 and the reception antennas 31. The electronic device 1 may also appropriately include at least any of other functional units such as the controller 10.

The controller 10 included in the electronic device 1 according to the one embodiment is capable of controlling the individual functional units of the electronic device 1 and controlling operations of the entire electronic device 1. In one embodiment, the controller 10 may include a function of performing various kinds of signal processing on a reception signal received as a reflected wave by the reception unit 30. To provide control and processing capabilities for executing various functions, the controller 10 may include at least one processor, for example, a CPU (Central Processing Unit). The controller 10 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In the one embodiment, the controller 10 may be configured as, for example, a CPU and a program executed by the CPU. The controller 10 may appropriately include a memory (any storage unit) necessary for operations of the controller 10.

The any storage unit (the memory necessary for operations of the controller 10) may store a program executed by the controller 10, results of processing performed by the controller 10, and so on. The any storage unit may function as a work memory of the controller 10. The any storage unit can be implemented by, but not limited to, a semiconductor memory or a magnetic disk, for example, and may be implemented by any storage device. The any storage unit may be, for example, a storage medium such as a memory card inserted to the electronic device 1 according to the present embodiment. The any storage unit may be an internal memory of the CPU used as the controller 10 as described above.

In one embodiment, the any storage unit may store various parameters for setting a range in which an object is detected based on a transmission wave T transmitted from each transmission antenna 25 and a reflected wave R received from each reception antenna 31.

In the electronic device 1 according to the one embodiment, the controller 10 is capable of controlling at least one of the transmission unit 20 or the reception units 30. In this case, the controller 10 may control at least one of the transmission unit 20 or the reception units 30, based on various kinds of information stored in the any storage unit. In the electronic device 1 according to the one embodiment, the controller 10 may instruct the signal generating unit 21 to generate a signal or may control the signal generating unit 21 to generate a signal.

In accordance with control performed by the controller 10, the signal generating unit 21 generates a signal (transmission signal) to be transmitted as the transmission wave T from each of the transmission antennas 25. When generating a transmission signal, the signal generating unit 21 may allocate a frequency of the transmission signal in accordance with control performed by the controller 10, for example. Specifically, the signal generating unit 21 may allocate the frequency of the transmission signal in accordance with a parameter set by the controller 10, for example. For example, the signal generating unit 21 receives frequency information from the controller 10 or the any storage unit and generates a signal having a predetermined frequency in a frequency band such as from 77 GHz to 81 GHz, for example. The signal generating unit 21 may include a functional unit such as a voltage control oscillator (VCO), for example.

The signal generating unit 21 may be configured as hardware having the function, for example as a microcomputer, or for example as a processor such as a CPU and a program or the like executed by the processor. Each functional unit described below may also be configured as hardware having the function, for example as a microcomputer if possible, or for example as a processor such as a CPU and a program or the like executed by the processor if possible.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. For example, the controller 10 may set in advance the signal generated by the signal generating unit 21. For example, the any storage unit or the like may store in advance the signal generated by the signal generating unit 21. Since a chirp signal used in a technical field such as the radar is known, more detailed description is appropriately simplified or omitted. The signal generated by the signal generating unit 21 is supplied to the synthesizer 22.

Figure 4:
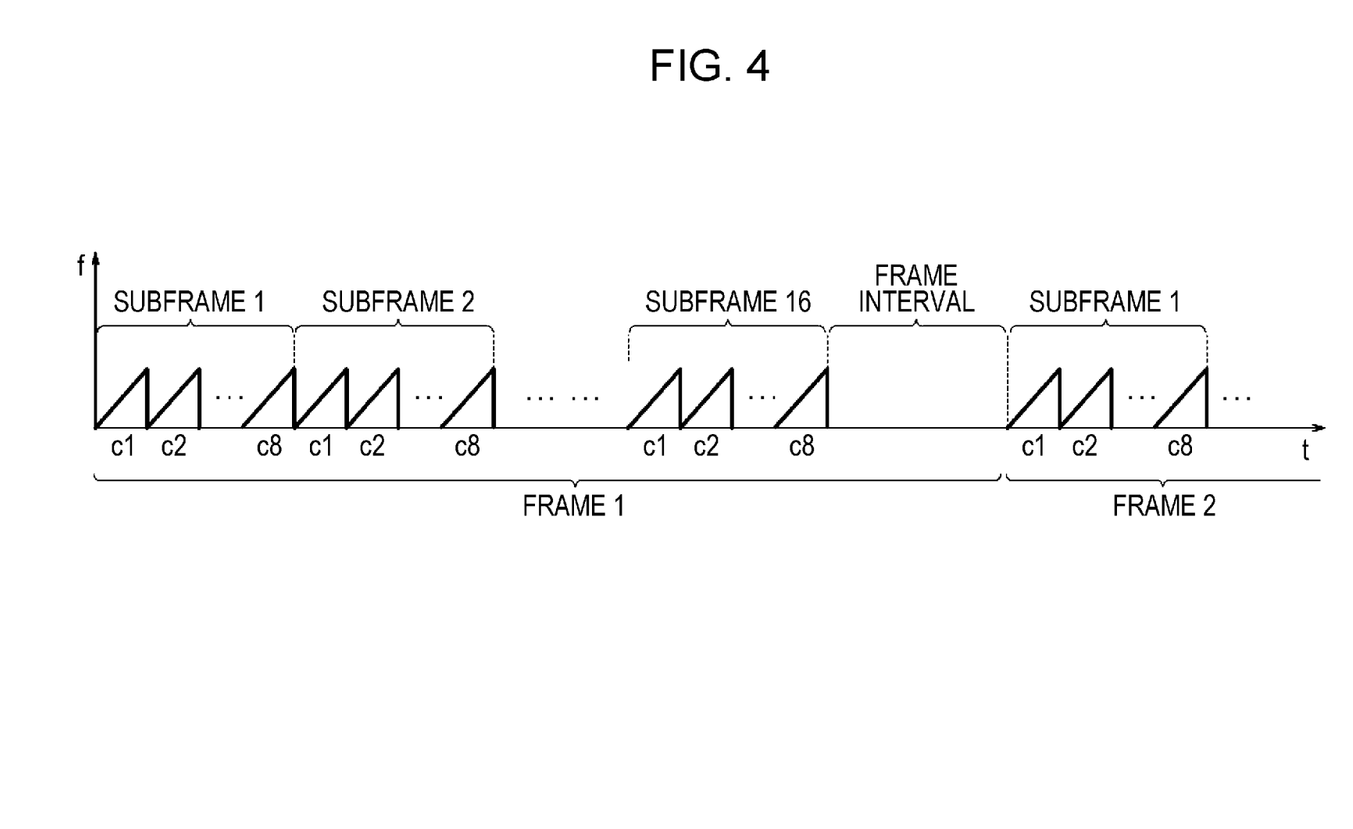
FIG. 4 is a diagram for describing a configuration of a transmission signal according to the one embodiment.

FIG. 4 is a diagram for describing an example of chirp signals generated by the signal generating unit 21.

In FIG. 4, the horizontal axis represents elapsed time and the vertical axis represents a frequency. In the example illustrated in FIG. 4, the signal generating unit 21 generates linear chirp signals whose frequency changes linearly and periodically. FIG. 4 illustrates chirp signals $c1$, $c2$, $c8$. As illustrated in FIG. 4, the frequency of each chirp signal linearly increases as time elapses.

In the example illustrated in FIG. 4, one subframe includes eight chirp signals $c1$, $c2$, $c8$. That is, each of subframes such as a subframe 1 and a subframe 2 illustrated in FIG. 4 includes eight chirp signals $c1$, $c2$, $c8$. In the example illustrated in FIG. 4, one frame includes 16 subframes such as the subframes 1 to 16. That is, each of frames such as a frame 1 and a frame 2 illustrated in FIG. 4 includes 16 subframes. As illustrated in FIG. 4, a frame interval of a predetermined length may be included between frames. One frame illustrated in FIG. 4 may have a length of about 30 ms to 50 ms, for example.

In FIG. 4, the frame 2 and subsequent frames may have the same and/or similar configuration. In FIG. 4, the frame 3 and subsequent frames may have the same and/or similar configuration. In the electronic device 1 according to the one embodiment, the signal generating unit 21 may generate a transmission signal as any number of frames. In FIG. 4, an illustration of some chirp signals is omitted. As described above, for example, the any storage unit or the like may store a relationship between time and a frequency of the transmission signal generated by the signal generating unit 21.

As described above, the electronic device 1 according to the one embodiment may transmit a transmission signal made up of subframes each including multiple chirp signals. The electronic device 1 according to the one embodiment may transmit a transmission signal made up of frames each including a predetermined number of subframes.

In the description below, the electronic device 1 transmits a transmission signal having a frame structure illustrated in FIG. 4. However, the frame structure illustrated in FIG. 4 is an example. For example, the number of chirp signals included in one subframe is not limited to eight. In one embodiment, the signal generating unit 21 may generate a subframe including any number of (for example, multiple) chirp signals. The subframe structure illustrated in FIG. 4 is also an example. For example, the number of subframes included in one frame is not limited to 16. In one embodiment, the signal generating unit 21 may generate a frame including any number of (for example, multiple) subframes. The signal generating unit 21 may generate signals having different frequencies. The signal generating unit 21 may generate multiple discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. For example, the controller 10 may set the frequency selected as the frequency of the transmission wave T to be transmitted from each of the transmission antennas 25. For example, the any storage unit may store the frequency selected as the frequency of the transmission wave T to be transmitted from each of the transmission antennas 25. The signal whose frequency has been increased by the synthesizer 22 is supplied to the phase control unit 23 and the mixer 33. When the multiple phase control units 23 are present, the signal whose frequency has been increased by the synthesizer 22 may be supplied to each of the multiple phase control units 23. When multiple reception units 30 are present, the signal whose frequency has been increased by the synthesizer 22 may be supplied to the mixer 33 of each of the multiple reception units 30.

Each of the phase control units 23 controls a phase of the transmission signal supplied from the synthesizer 22. Specifically, for example, in accordance with control performed by the controller 10, each of the phase control units 23 may appropriately advance or delay the phase of the signal supplied from the synthesizer 22 to adjust the phase of the transmission signal. In this case, based on a difference between paths of the transmission waves T to be transmitted from the multiple transmission antennas 25, the phase control units 23 may adjust the phases of the respective transmission signals. The phase control units 23 appropriately adjust the phases of the respective transmission signals, so that the transmission waves T transmitted from the multiple transmission antennas 25 enhance with each other in a predetermined direction to form a beam (beamforming). In this case, for example, the any storage unit may store a correlation between a direction of beamforming and amounts of phase by which the respective transmission signals transmitted by the multiple transmission antennas 25 are to be controlled. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the controller 10, for example. When the electronic device 1 includes the multiple transmission antennas 25, each of the multiple amplifiers 24 may amplify power (electric power) of the transmission signal supplied from a respective one of the multiple phase control units 23 in accordance with control performed by the controller 10, for example. Since the technology for amplifying power of a transmission signal is already known, more detailed description is omitted. The amplifier 24 is connected to the transmission antenna 25.

The transmission antenna 25 outputs (transmits), as the transmission wave T, the transmission signal amplified by the amplifier 24. When the electronic device 1 includes the multiple transmission antennas 25, each of the multiple transmission antennas 25 may output (transmit), as the transmission wave T, the transmission signal amplified by a respective one of the multiple amplifiers 24. Since the transmission antennas 25 can have a configuration that is the same as and/or similar to the configuration of transmission antennas for use in the known radar technology, more detailed description is omitted.

Accordingly, the electronic device 1 according to the one embodiment, which includes the transmission antennas 25, can transmit transmission signals (for example, transmission chirp signals) as the transmission waves T from the respective transmission antennas 25. At least one of the functional units of the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the electronic device 1 is installed on the stationary object 100, each of the transmission antennas 25 may transmit the transmission wave T to outside the stationary object 100 through a cover member such as a radar cover, for example. In this case, the radar cover may be made of a material, for example, a synthetic resin or rubber, that allows an electromagnetic wave to pass therethrough. This radar cover may also serve as a housing of the electronic device 1, for example. Covering the transmission antennas 25 with a member such as the radar cover can reduce a risk of the transmission antennas 25 being damaged or malfunctioning because of a contact with an external object. The radar cover and the housing may also be referred to as a radome.

FIG. 2 illustrates an example of the electronic device 1 that includes two transmission antennas 25. However, in one embodiment, the electronic device 1 may include any number of transmission antennas 25. On the other hand, in one embodiment, the electronic device 1 may include the multiple transmission antennas 25 when the transmission waves T transmitted from the respective transmission antennas 25 form a beam in a predetermined direction. In one embodiment, the electronic device 1 may include multiple transmission antennas 25. In this case, the electronic device 1 may include the multiple phase control units 23 and the multiple amplifiers 24 to correspond to the multiple transmission antennas 25. Each of the multiple phase control units 23 may control the phase of a respective one of the multiple transmission waves supplied from the synthesizer 22 and to be transmitted from the respective transmission antennas 25. Each of the multiple amplifiers 24 may amplify power of a respective one of the multiple transmission signals to be transmitted from the respective transmission antennas 25. In this case, the electronic device 1 may include the multiple transmission antennas. As described above, when the electronic device 1 illustrated FIG. 2 includes the multiple transmission antennas 25, the electronic device 1 may include multiple functional units necessary for transmitting the transmission waves T from the multiple transmission antennas 25.

The reception antenna 31 receives the reflected wave R. The reflected wave R may be the transmission wave T reflected off the predetermined object 200. The reception antenna 31 may include multiple antennas such as the reception antennas 31A to 31D, for example. Since the reception antennas 31 can have a configuration that is the same as and/or similar to the configuration of reception antennas for use in the known radar technology, more detailed description is omitted. The reception antenna 31 is connected to the LNA 32. A reception signal based on the reflected wave R received by the reception antenna 31 is supplied to the LNA 32.

The electronic device 1 according to the one embodiment can receive, from each of the multiple reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the electronic device 1 is installed on the stationary object 100, each of the reception antennas 31 may receive the reflected wave R from the outside of the stationary object 100 through a cover member such as a radar cover, for example. In this case, the radar cover may be made of a material, for example, a synthetic resin or rubber, that allows an electromagnetic wave to pass therethrough. This radar cover may also serve as a housing of the electronic device 1, for example. Covering the reception antennas 31 with a member such as the radar cover can reduce a risk of the reception antennas 31 being damaged or malfunctioning because of a contact with an external object. The radar cover and the housing may also be referred to as a radome.

When the reception antenna 31 is installed near the transmission antenna 25, these reception antenna 31 and transmission antenna 25 may be collectively included in the one electronic device 1. That is, for example, the one electronic device 1 may include at least one transmission antenna 25 and at least one reception antenna 31. For example, the one electronic device 1 may include multiple transmission antennas 25 and multiple reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) and supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be configured as any analog-to-digital conversion circuit (Analog-to-Digital Converter (ADC)). The digitized beat signal obtained by the AD conversion unit 35 is supplied to the distance FFT processing unit 11 of the controller 10. When the multiple reception units 30 are present, the digitized beat signals obtained by the respective AD conversion units 35 may be supplied to the distance FFT processing unit 11.

The distance FFT processing unit 11 of the controller 10 illustrated in FIG. 3 performs processing for estimating a distance between the stationary object 100 equipped with the electronic device 1 and the object 200, based on the beat signals supplied from the AD conversion units 35 of the reception units 30. The distance FFT processing unit 11 may include a processing unit that performs fast Fourier transform, for example. In this case, the distance FFT processing unit 11 may be configured as any circuit, any chip, or the like that performs fast Fourier transform (FFT). The distance FFT processing unit 11 may preform Fourier transform other than fast Fourier transform.

The distance FFT processing unit 11 performs FFT processing (hereinafter, appropriately referred to as "distance FFT processing") on the digitized beat signals obtained by the AD conversion units 35. For example, the distance FFT processing unit 11 may perform FFT processing on complex signals supplied from the AD conversion units 35. The digitized beat signals obtained by the AD conversion units 35 can be represented as temporal changes in signal intensity (power). The distance FFT processing unit 11 performs FFT processing on such beat signals, so that the beat signals can be represented as a signal intensity (power) for each frequency. Through the distance FFT processing performed by the distance FFT processing unit 11, complex signals corresponding to the distance can be obtained based on the digitized beat signals obtained by the AD conversion units 35.

If a peak in a result obtained by the distance FFT processing is equal to or greater than a predetermined threshold, the distance FFT processing unit 11 may determine that the predetermined object 200 is located at the distance corresponding to the peak. For example, in a known method such as constant false alarm rate (CFAR)-based detection processing, an object (reflecting object) that reflects a transmission wave is determined to be present if a peak value that is equal to or greater than a threshold is detected from the average power or amplitude of a disturbance signal.

As described above, the electronic device 1 according to the one embodiment can detect, as the target, the object 200 that reflects the transmission wave T, based on the transmission signal transmitted as the transmission wave T and the reception signal received as the reflected wave R. In one embodiment, the controller 10 of the electronic device 1 may perform the operation described above.

The distance FFT processing unit 11 can estimate a distance to a predetermined object, based on one chimp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The result (for example, distance information) of the distance FFT processing performed by the distance FFT processing unit 11 may be supplied to the velocity FFT processing unit 12. The result of the distance FFT processing performed by the distance FFT processing unit 11 may also be supplied to the determining unit 16, the angle-of-arrival estimating unit 17, the object detecting unit 18, and/or the like at the subsequent stage.

The velocity FFT processing unit 12 performs processing for estimating a relative velocity of the object 200 with respect to the stationary object 100 equipped with the electronic device 1, based on the beat signals on which the distance FFT processing unit 11 has performed the distance FFT processing. The velocity FFT processing unit 12 may include a processing unit that performs fast Fourier transform, for example. In this case, the velocity FFT processing unit 12 may be configured as any circuit, any chip, or the like that performs fast Fourier transform (FFT). The velocity FFT processing unit 12 may preform Fourier transform other than fast Fourier transform.

The velocity FFT processing unit 12 further performs FFT processing (hereinafter, appropriately referred to as "velocity FFT processing") on the beat signals on which the distance FFT processing unit 11 has performed the distance FFT processing. For example, the velocity FFT processing unit 12 may perform FFT processing on the complex signals supplied from the distance FFT processing unit 11. The velocity FFT processing unit 12 can estimate a relative velocity of the predetermined object on the basis of a subframe (for example, the subframe 1 illustrated in FIG. 3) including chirp signals. Through the velocity FFT processing performed on the multiple chirp signals by the velocity FFT processing unit 12, complex signals corresponding to the relative velocity can be obtained based on the complex signals corresponding to the distance obtained by the distance FFT processing unit 11.

Through the distance FFT processing performed on the beat signals in the above-described manner, multiple vectors can be generated. The velocity FFT processing unit 12 can estimate a relative velocity of the predetermined object by determining a phase of a peak in a result of the velocity FFT processing performed on these multiple vectors. That is, the electronic device 1 can measure (estimate) a relative velocity of the predetermined object 200 with respect to the stationary object 100 illustrated in FIG. 1 by performing the velocity FFT processing. Since a technique for measuring (estimating) a relative velocity of a predetermined object by performing velocity FFT processing on a result of distance FFT processing is known, more detailed description is appropriately simplified or omitted. The result (for example, velocity information) of the velocity FFT processing performed by the velocity FFT processing unit 12 may be supplied to the angle-of-arrival estimating unit 17. The result of the velocity FFT processing performed by the velocity FFT processing unit 12 may also be supplied to the determining unit 16, the object detecting unit 18, and/or the like at the subsequent stage.

When performing velocity FFT processing, the velocity FFT processing unit 12 may apply window control to avoid the occurrence of discontinuities. In such a case, the velocity FFT processing unit 12 may skip outputting a relative velocity adjacent to the relative velocity of the stationary object.

The difference calculating unit 13 stores, in the storage unit 14, a signal intensity corresponding to a distance of an area where the relative velocity with respect to the electronic device 1 is zero (that is, an area for the stationary object). The signal intensity may indicate the power or amplitude of the reception signal. The difference calculating unit 13 may store, in the storage unit 14, a distribution of the signal intensity corresponding to the distance of the area for the stationary object when calculating difference data.

The storage unit 14 may store a program executed by the controller 10 or functional units of the controller 10, results of processing performed by the controller 10, and so on. The storage unit 14 may function as a work memory of the controller 10. The storage unit 14 can be implemented by, but not limited to, a semiconductor memory or a magnetic disk, for example, and may be implemented by any storage device. The storage unit 14 may be, for example, a storage medium such as a memory card inserted to the electronic device 1 according to the present embodiment. The storage unit 14 may be an internal memory of the CPU used as the controller 10 as described above. The storage unit 14 may also function as the any storage unit described above.

The difference calculating unit 13 may average the signal intensities (powers or amplitudes), stored in the storage unit 14, corresponding to the distance of the area for the stationary object in two or more different time slots.

As described above, the difference calculating unit 13 performs the distance FFT processing and the velocity FFT processing on the beat signals received in a frame of the transmission wave in the above-described manner. The difference calculating unit 13 calculates a difference between the distribution of the signal intensity (power or amplitude) corresponding to the distance to the stationary object and the distribution of the signal intensity corresponding to the distance for the relative velocity of the stationary object stored in the storage unit 14.

On the other hand, the difference calculating unit 13 may skip calculating the difference in the signal intensity corresponding to the distance of the area where the relative velocity to the electronic device 1 is not zero (that is, an area not for the stationary object). The signal intensity of the complex signal corresponding to the distance in calculating the difference may be smoothed using a moving average over two or more different time slots, for example, a moving average across frames of the transmission wave.

The update processing unit 15 updates difference data used by the difference calculating unit 13 as occasion arises. For example, if a correlation value of pieces of difference data acquired at two or more different times among pieces of difference data stored in the storage unit 14 is equal to or greater than a threshold, the update processing unit 15 may determine that an environment around the stationary object remains unchanged and update the difference data. When updating the difference data, the update processing unit 15 may acquire data while changing the time several times and adopt the difference data free from a change.

The determining unit 16 performs determination processing for a distance and/or a relative velocity, based on the result of the distance FFT processing performed by the distance FFT processing unit 11 and/or the result of the velocity FFT processing performed by the velocity FFT processing unit 12. The determining unit 16 determines whether an object is detected at a predetermined distance and/or a predetermined relative velocity. The determination performed by the determining unit 16 is further described below.

In a common FM-CW radar technology, whether a target is present can be determined based on a result of fast Fourier transform processing or the like performed on a beat frequency extracted from a reception signal. The result of the fast Fourier transform processing or the like performed on the beat frequency extracted from the reception signal includes a noise component due to clutter (extraneous reflection component) or the like. Thus, processing may be performed to remove the noise component from the processing result of the reception signal and extract a target signal alone.

Methods for deter mining whether the target is present include a scheme (threshold detection scheme) in which a threshold is set for the output of the reception signal and the target is determined to be present if the intensity of the reflected signal exceeds the threshold. When this scheme is employed, the target is determined also when the signal intensity of clutter exceeds the threshold. Consequently, a so-called "false alarm" is issued. Whether this signal intensity of clutter exceeds the threshold is a matter of a probability. The probability of this signal intensity of clutter exceeding the threshold is called "a probability of false alarm". As a method for suppressing this probability of false alarm to be low and constant, the constant false alarm rate can be used.

Hereinafter, the constant false alarm rate is also simply referred to as CFAR. CFAR employs an assumption that the signal intensity (amplitude) of noise conforms to a Rayleigh distribution. Based on this assumption, with a fixed weight for calculating a threshold for use in determining whether a target is detected, an error rate of target detection becomes theoretically constant regardless of the amplitude of noise.

A scheme called Cell-Averaging CFAR (hereinafter, also referred to as CA-CFAR) is known CFAR in the common radar technology. In CA-CFAR, a signal intensity value (for example, an amplitude value) of the reception signal having undergone predetermined processing may be sequentially input to a shift register at a constant sampling frequency. This shift register includes a cell under test at the center thereof and includes multiple reference cells on both sides of the cell under test. Every time the signal intensity value is input to the shift register, each signal intensity value input previously is moved from a cell on one end side (for example, a left end side) to a cell on the other end side (for example, a right end side) of the shift register by one. In synchronization with the input timing, the values in the reference cells are averaged. The average value thus obtained is multiplied by a prescribed weight, and the result is calculated as a threshold. If the value in the cell under test is greater than the threshold thus calculated, the value in the cell under test is output. On the other hand, if the value in the cell under test is not greater than the calculated threshold, a value of 0 (zero) is output. As described above, in CA-CFAR, the threshold is calculated from the average value of the values in the reference cells and whether a target is present is determined. In this manner, a detection result can be obtained.

In CA-CFAR, for example, when multiple targets are present in the vicinity to each other, the threshold calculated in the vicinity of the targets increases because of the nature of the algorithm. Thus, there may be a target that is not detected regardless of the sufficient signal intensity. Likewise, when there is a clutter step, the calculated threshold increases also in the vicinity of the clutter step. In this case, detection of a small target located in the vicinity of the clutter step may fail.

In relation to CA-CFAR described above, there is a technique called Order Statistic CFAR (hereinafter, also referred to as OS-CFAR) as a technique for obtaining a threshold from the median of the values in the reference cells or from a value at a prescribed place in order of the values in the reference cells sorted in ascending order. OS-CFER is a technique in which a threshold is set based on ordered statistics and a target is deter mined to be present if the signal intensity exceeds the threshold. The above-described issues in CA-CFAR are dealt with this OS-CFAR. OS-CFAR can be implemented by performing processing that is partially different from the processing of CA-CFAR. In the description below, the electronic device 1 according to the one embodiment performs the OS-CFAR processing.

The determining unit 16 may use OS-CFAR to determine whether an object is detected. In this case, the determining unit 16 may use different thresholds for an area of a stationary object and an area of a non-stationary object to perform the determination. The determining unit 16 may skip detecting an area of the relative velocity adjacent to the stationary object when the above-described window control is applied. The determining unit 16 may use an area of a different distance at the same relative velocity, as an area of noise used in OS-CFAR.

The angle-of-arrival estimating unit 17 estimates a direction (angle of arrival) from which the reflected wave R arrives from the predetermined object 200, based on a result of the determination performed by the determining unit 16. The angle-of-arrival estimating unit 17 may estimate the angle of arrival for a point for which the determining unit 16 has determined that the threshold is met. The electronic device 1 can estimate the direction from which the reflected wave R arrives, by receiving the reflected wave R from the multiple reception antennas 31. For example, the multiple reception antennas 31 are arranged at a predetermined interval. In this case, the transmission wave T transmitted from the transmission antenna 25 is reflected off the predetermined object 200 to become the reflected wave R. Each of the multiple reception antennas 31 arranged at the predetermined interval receives the reflected wave R. The angle-of-arrival estimating unit 17 can estimate the direction from which the reflected wave R arrives at each of the multiple reception antennas 31, based on the phase of the reflected wave R received by the reception antenna 31 and a difference in path of the reflected wave R. That is, the electronic device 1 can measure (estimate) the angle of arrival $\theta$ illustrated in FIG. 1, based on the result of the velocity FFT processing.

Various techniques for estimating the direction from which the reflected wave R arrives based on a result of velocity FFT processing have been proposed. For example, MUSIC (MUltiple Signal Classification), ESPRIT (Estimation of Signal Parameters via Rotational Invariance Technique), and the like are known direction-of-arrival estimation algorithms. Thus, more detailed description of the known techniques is appropriately simplified or omitted. Information (angle information) on the angle of arrival $\theta$ estimated by the angle-of-arrival estimating unit 17 may be supplied to the object detecting unit 18.

The object detecting unit 18 detects an object located in a range to which the transmission wave T is transmitted, based on the information supplied from at least any of the distance FFT processing unit 11, the velocity FFT processing unit 12, or the angle-of-arrival estimating unit 17. The object detecting unit 18 may perform detection of an object by performing, for example, clustering processing based on the supplied distance information, velocity information, and angle information. For example, DBSCAN (Density-based spatial clustering of applications with noise) or the like is a known algorithm used in clustering of data. In the clustering processing, for example, average power of points constituting the detected object may be calculated. The distance information, the velocity information, the angle information, and the power information of the object detected by the object detecting unit 18 may be supplied to another device, for example. The object detecting unit 18 may calculate the average power of the point cloud representing the object.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, since the electronic device 1 includes the two transmission antennas 25 and the four reception antennas 31, the electronic device 1 can be considered to include a virtual antenna array virtually including eight antennas. As described above, the electronic device 1 may receive the reflected wave R of 16 subframes illustrated in FIG. 4 by using, for example, the eight virtual antennas.

An operation of the electronic device 1 according to the one embodiment is described.

Figure 5:
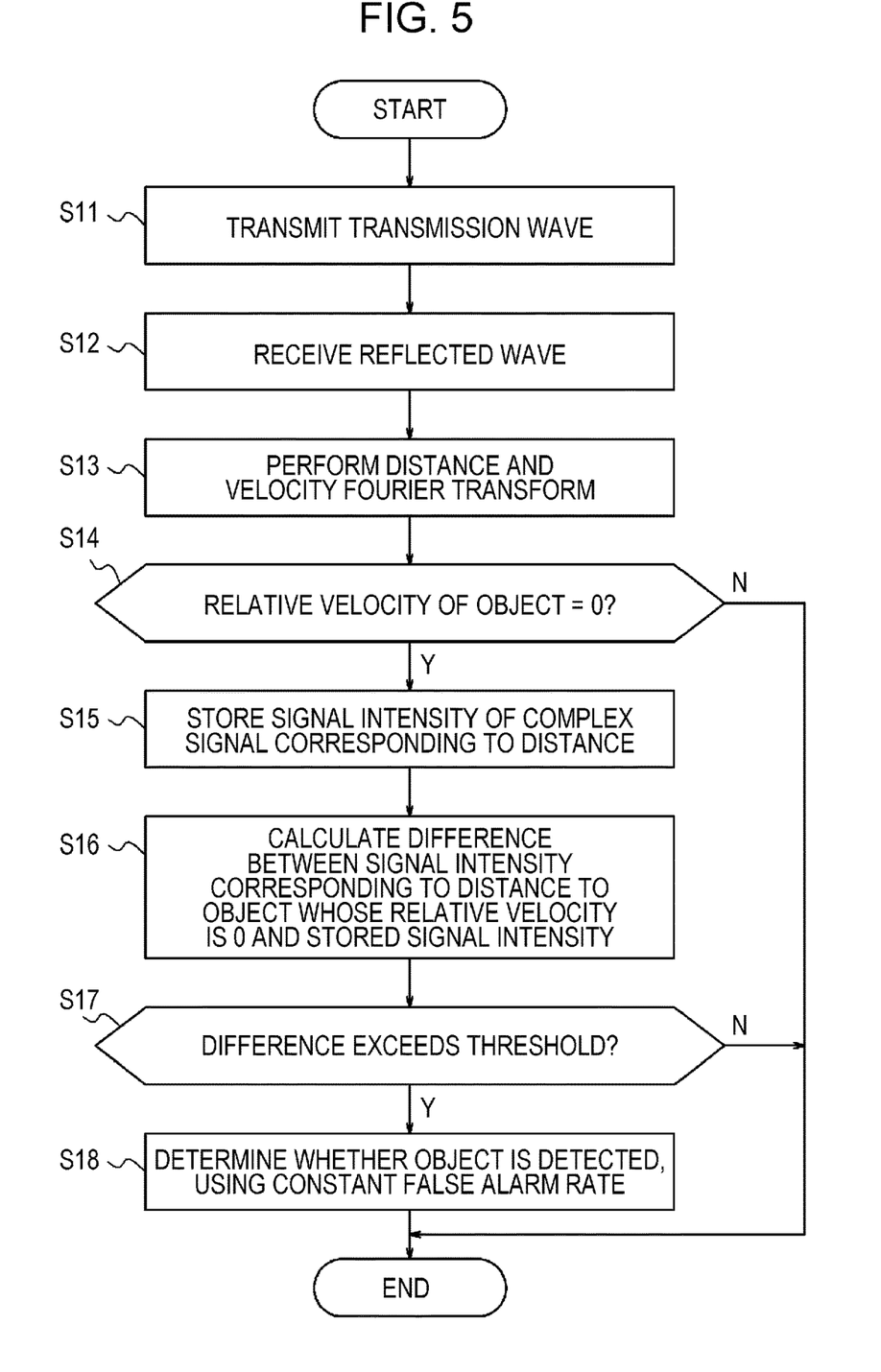
FIG. 5 is a flowchart for describing an operation of the electronic device according to the one embodiment.

FIG. 5 is a flowchart for describing an operation performed by the electronic device 1. A flow of the operation performed by the electronic device 1 is briefly described below. The operation illustrated in FIG. 5 may be started, for example, when the electronic device 1 attached to the stationary object 100 attempts to detect an object located around the stationary object 100.

In response to the start of the process illustrated FIG. 5 the controller 10 performs control so that a transmission wave is transmitted from the transmission antenna 25 of the electronic device 1 (step S11).

After the transmission wave is transmitted in step S11, the controller 10 performs control so that a reflected wave that is the transmission wave reflected off an object is received from the reception antenna 31 of the electronic device 1 (step S12).

In response to receipt of the reflected wave in step S12, the controller 10 performs the distance FFT processing and the velocity FFT processing on a beat signal based on the transmission wave and the reflected wave (step S13). In step S13, the distance FFT processing unit 11 may perform the distance FFT processing, and the velocity FFT processing unit 12 may perform the velocity FFT processing.

After the distance FFT processing and the velocity FFT processing are performed in step S3, the difference calculating unit 13 determines whether the relative velocity of the object with respect to the electronic device 1 is zero (step S14). If the relative velocity is not zero in step S14, the process illustrated in FIG. 5 may end. If the relative velocity is not zero in step S14, whether an object is detected may be determined using a threshold different from that used for a stationary object, as described above.

If the relative velocity is zero in step S14, the difference calculating unit 13 stores a signal intensity (power or amplitude) of a complex signal corresponding to the distance in the storage unit 14 (step S15).

After the signal intensity of the complex signal corresponding to the distance is stored in step S15, the difference calculating unit 13 perform processing of step S16. In step S16, the difference calculating unit 13 calculates a difference between the signal intensity corresponding to the distance with the relative velocity of zero, that is, the distance to the stationary object, and the signal intensity stored in the storage unit 14.

After the difference is calculated in step S16, the determining unit 16 determines whether the difference exceeds a predetermined threshold (step S17). If the difference does not exceed the threshold in step 17, the controller 10 may end the operation illustrated in FIG. 5. In this case, the OS-CFAR-based object detection may be skipped for the difference that does not exceed the threshold.

If the difference exceeds the threshold in step 17, the object detecting unit 18 performs the OS-CFAR-based object detection. The operation illustrated in FIG. 5 may be performed repeatedly, for example, at predetermined timings or irregularly.

The electronic device 1 according to the one embodiment performs the distance fast Fourier transform and the velocity fast Fourier transform, and then calculates a difference corresponding to a relative velocity of a stationary object. Thus, the electronic device 1 can detect a stationary object having a low reflectivity in an environment in which an object having a high reflectivity is located around the stationary object, for example. The electronic device 1 can also detect a moving object by performing dynamic detection using different thresholds. Thus, the electronic device 1 according to the one embodiment can detect an object with good accuracy.

Figure 6:
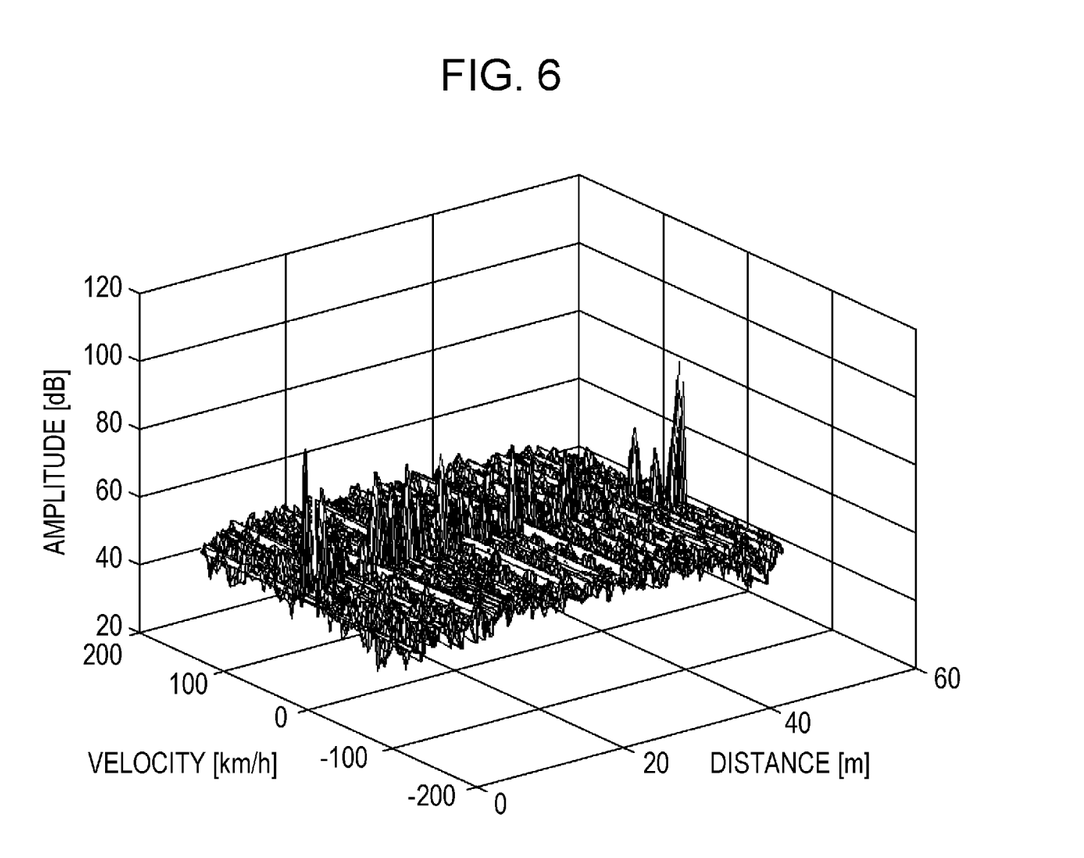
FIG. 6 is a diagram illustrating a comparative example for describing a processing result obtained by a controller according to the one embodiment.

FIG. 6 is a diagram illustrating, to compare with effects brought by the electronic device 1 according to the one embodiment, an example of a distribution of power with respect to a distance and a velocity after distance FFT processing of the related art and velocity FFT processing of the related art are performed. FIG. 2 indicates that the distribution of the signal intensity (amplitude) with respect to the distance at a relative velocity of zero (that is, a stationary object) is large.

Figure 7:
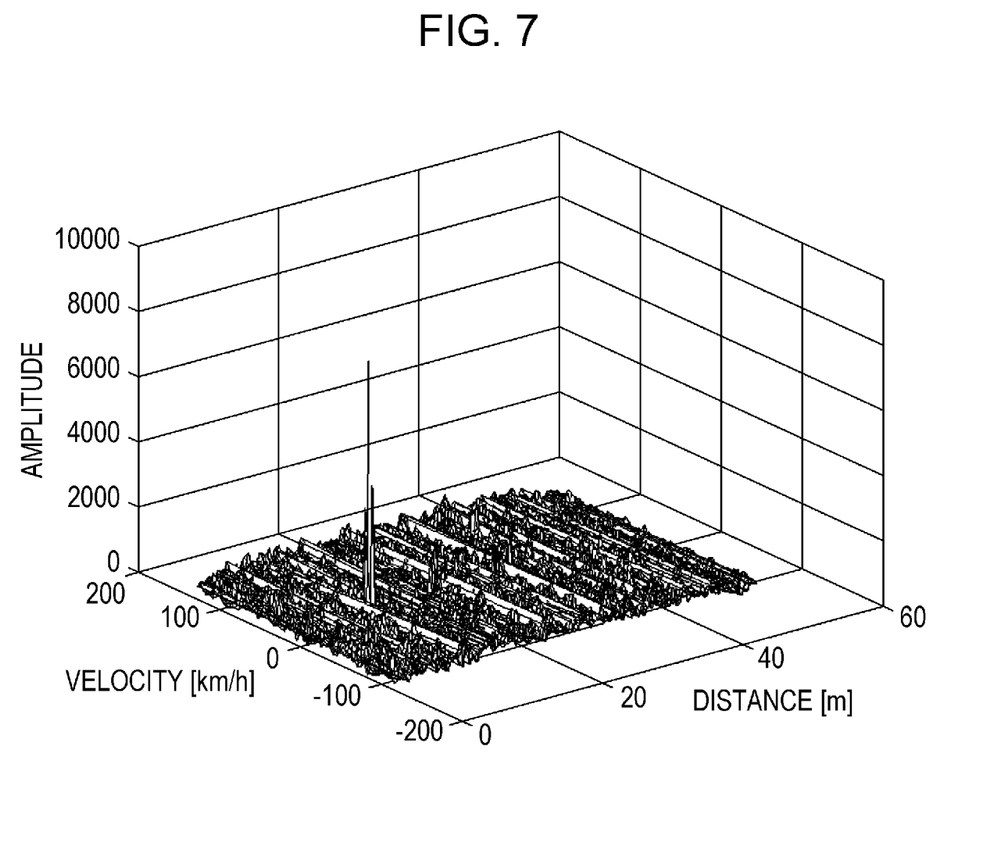
FIG. 7 is a diagram illustrating an example of a processing result obtained by a controller according to the one embodiment.

FIG. 7 is a diagram illustrating an example of detection performed by the electronic device 1 according to the one embodiment. FIG. 7 illustrates an example of a result of detection performed, by the electronic device 1 according to the one embodiment, on an object placed around the electronic device 1. FIG. 7 illustrates a distribution of power with respect to the distance and the velocity, for a result of subtracting difference data of a stationary object whose relative velocity is zero. FIG. 7 indicates that peaks appear for the object detected by the electronic device 1 according to the one embodiment.

While the present disclosure has been described based on the various drawings and the embodiments, it is to be noted that a person skilled in the art can easily make various variations or corrections based on the present disclosure. Therefore, it is to be noted that these variations or corrections are within the scope of the present disclosure. For example, functions and the like included in each functional unit can be rearranged without causing any logical contradiction. Multiple functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure based on the present disclosure. Therefore, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1.

REFERENCE SIGNS 1 electronic device
10 controller
11 distance FFT processing unit
12 velocity FFT processing unit
13 difference calculating unit
14 storage unit
15 update processing unit
16 determining unit
17 angle-of-arrival estimating unit
18 object detecting unit
20 transmission unit
21 signal generating unit
22 synthesizer
23 phase control unit
24 amplifier
25 transmission antenna
30 reception unit
31 reception antenna
32 LNA
33 mixer 34 IF unit
35 AD conversion unit

The invention claimed is:

1. An electronic device comprising:
a transmission antenna configured to transmit a transmission wave;
a reception antenna configured to receive a reflected wave that is the transmission wave having been reflected; and
a controller configured to detect a target by using a constant false alarm rate, based on a transmission signal transmitted as the transmission wave and a reception signal received as the reflected wave, wherein
the controller is configured to detect an object by using the constant false alarm rate, based on a signal intensity of a complex signal corresponding to a distance of the object whose relative velocity with respect to the electronic device is zero,
the controller is configured to detect the object by using the constant false alarm rate, based on a signal intensity stored as the signal intensity of the complex signal corresponding to the distance of the object whose relative velocity with respect to the electronic device is zero, and
the controller is configured to detect the object by using the constant false alarm rate, based on a difference between the signal intensity of the complex signal corresponding to the distance of the object whose relative velocity with respect to the electronic device is zero and the signal intensity stored by the controller.

2. The electronic device according to claim 1, wherein the controller is configured to store the signal intensity of the complex signal corresponding to the distance of the object whose relative velocity with respect to the electronic device is zero.

3. The electronic device according to claim 1, wherein the controller is configured to detect the object by using the constant false alarm rate with reference to different thresholds for the object whose relative velocity with respect to the electronic device is zero and an object whose relative velocity with respect to the electronic device is not zero.

4. A method for controlling an electronic device, comprising:
transmitting a transmission wave from a transmission antenna;
receiving, from a reception antenna, a reflected wave that is the transmission wave having been reflected; and
detecting a target by using a constant false alarm rate, based on a transmission signal transmitted as the transmission wave and a reception signal received as the reflected wave, wherein
in the detecting, an object is detected by using the constant false alarm rate, based on a signal intensity of a complex signal corresponding to a distance of the object whose relative velocity with respect to the electronic device is zero,
in the detecting, the object is detected by using the constant false alarm rate, based on a signal intensity stored as the signal intensity of the complex signal corresponding to the distance of the object whose relative velocity with respect to the electronic device is zero, and
in the detecting, the object is detected by using the constant false alarm rate, based on a difference between the signal intensity of the complex signal corresponding to the distance of the object whose relative velocity with respect to the electronic device is zero and the signal intensity that is stored.

5. The method according to claim 4, further comprising:
storing the signal intensity of the complex signal corresponding to the distance of the object whose relative velocity with respect to the electronic device is zero.

6. A non-transitory computer-readable recording medium storing computer program instructions, which when executed by an electronic device, cause the electronic device to:
transmit a transmission wave from a transmission antenna;
receive, from a reception antenna, a reflected wave that is the transmission wave having been reflected; and
detect a target by using a constant false alarm rate, based on a transmission signal transmitted as the transmission wave and a reception signal received as the reflected wave, wherein
detect an object by using the constant false alarm rate, based on a signal intensity of a complex signal corresponding to a distance of the object whose relative velocity with respect to the electronic device is zero,
detect the object by using the constant false alarm rate, based on a signal intensity stored as the signal intensity of the complex signal corresponding to the distance of the object whose relative velocity with respect to the electronic device is zero, and
detect the object by using the constant false alarm rate, based on a difference between the signal intensity of the complex signal corresponding to the distance of the object whose relative velocity with respect to the electronic device is zero and the signal intensity that is stored.

7. The non-transitory computer-readable recording medium storing computer program instructions according to claim 6, which when executed by an electronic device, cause the electronic device to:
store the signal intensity of the complex signal corresponding to the distance of the object whose relative velocity with respect to the electronic device is zero.

* * * * *